(12) United States Patent
Woo et al.

(10) Patent No.: US 9,189,827 B2
(45) Date of Patent: Nov. 17, 2015

(54) VIDEO CODES FOR ENCODING/DECODING STREAMING DATA

(71) Applicant: Massachusetts Institute of Technology, Cambridge, MA (US)

(72) Inventors: Grace Rusi Woo, Cambridge, MA (US); Andrew B Lippman, Salem, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 442 days.

(21) Appl. No.: 13/632,422

(22) Filed: Oct. 1, 2012

(65) Prior Publication Data

US 2013/0089133 A1    Apr. 11, 2013

Related U.S. Application Data

(60) Provisional application No. 61/545,779, filed on Oct. 11, 2011.

(51) Int. Cl.
*G06T 1/00*    (2006.01)
*H04N 7/025*    (2006.01)
*H04N 7/035*    (2006.01)

(52) U.S. Cl.
CPC ....... *G06T 1/0085* (2013.01); *G06T 2201/0052* (2013.01)

(58) Field of Classification Search
CPC .......... G06Q 20/3274; G06Q 20/3276; G06T 1/0085
USPC .......................................... 382/205; 380/100
See application file for complete search history.

(56) References Cited

PUBLICATIONS

Grundhofer, Anselm, et al. "Dynamic adaptation of projected imperceptible codes." Mixed and Augmented Reality, 2007. ISMAR 2007. 6th IEEE and ACM International Symposium on. IEEE, 2007.*
Kumar, Sunil, et al. "Error resiliency schemes in H. 264/AVC standard." Journal of Visual Communication and Image Representation 17.2 (2006): 425-450.*
Grundhöfer, Anselm, et al. "Dynamic adaptation of projected imperceptible codes." Mixed and Augmented Reality, 2007. ISMAR 2007. 6th IEEE and ACM International Symposium on. IEEE, 2007.*

* cited by examiner

*Primary Examiner* — Sath V Perungavoor
*Assistant Examiner* — Clifford Hilaire
(74) *Attorney, Agent, or Firm* — Sam Pasternack; MIT Technology Licensing Office

(57) ABSTRACT

System for conveying a stream of information. The system includes an encoding device employing a spatio-temporal coding scheme that omits light, including codes embedded therein that are invisible to a user. A receiver that might be a cell phone camera receives light from the encoding device and computer apparatus is programmed with software to decode the received light to generate the stream of information. The encoding device is preferably a video display.

10 Claims, 5 Drawing Sheets

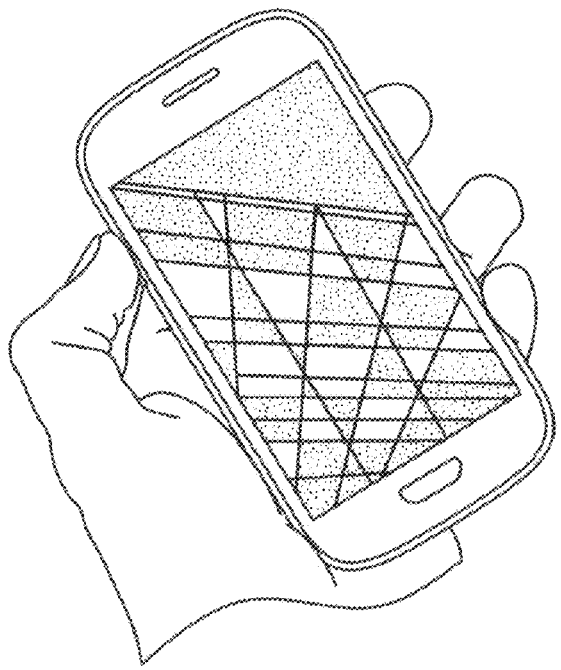
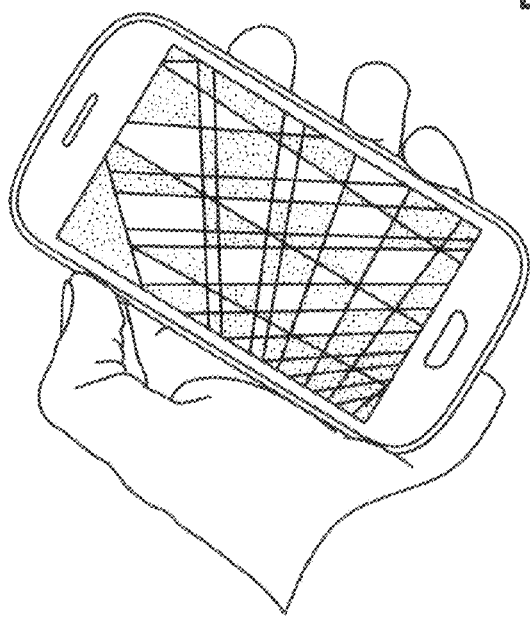
FIG. 5
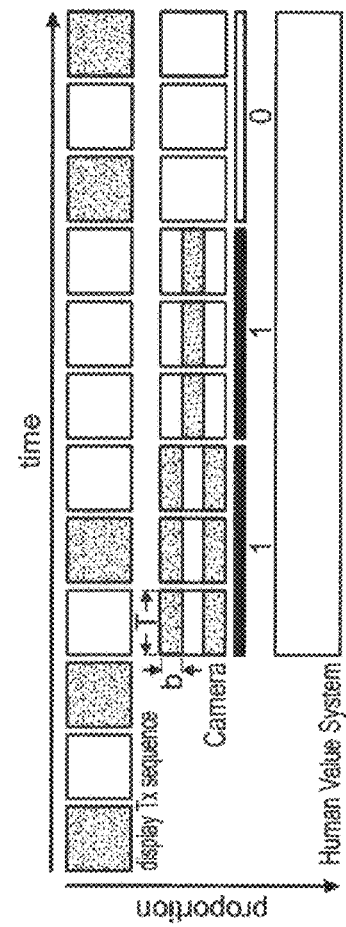
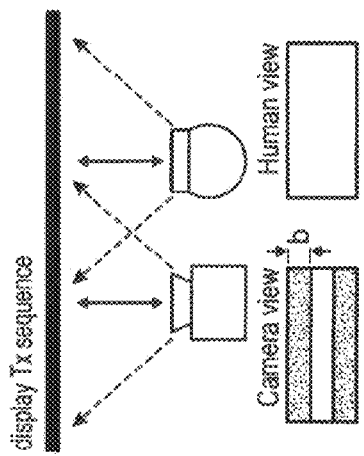
FIG. 6

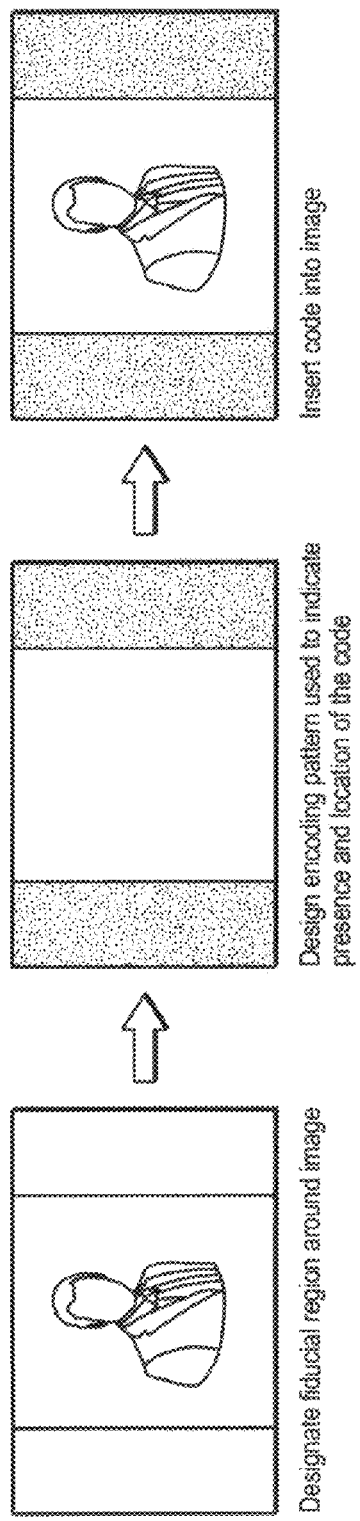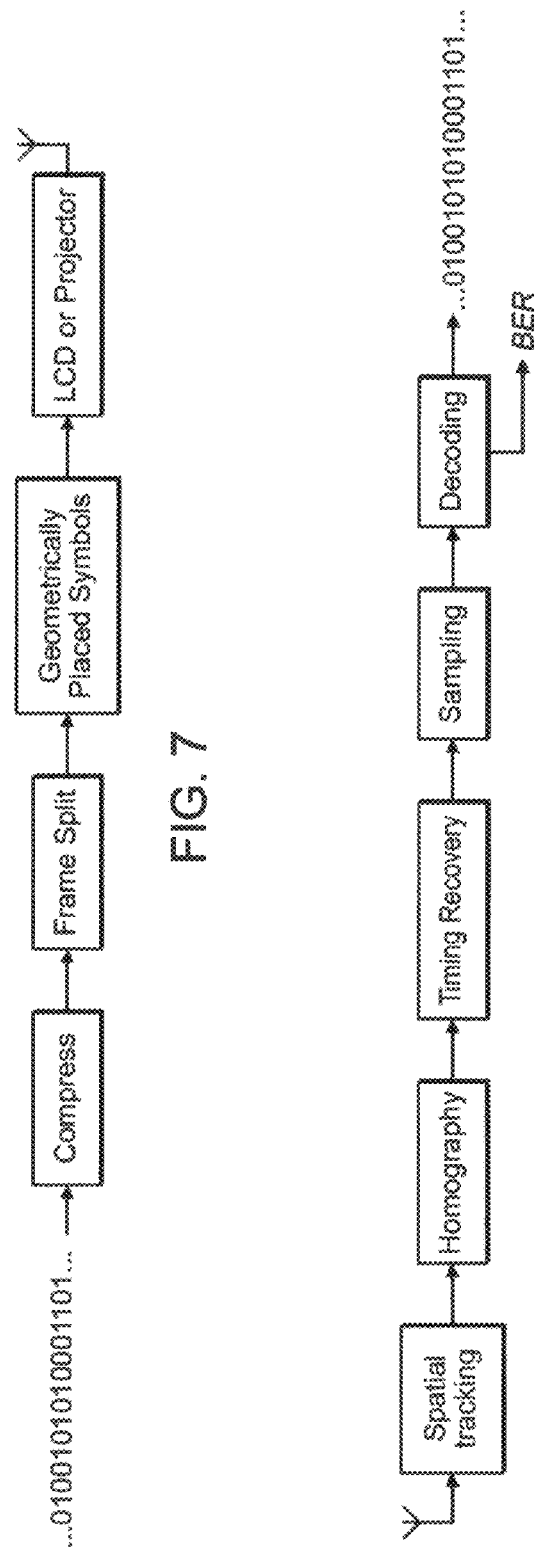

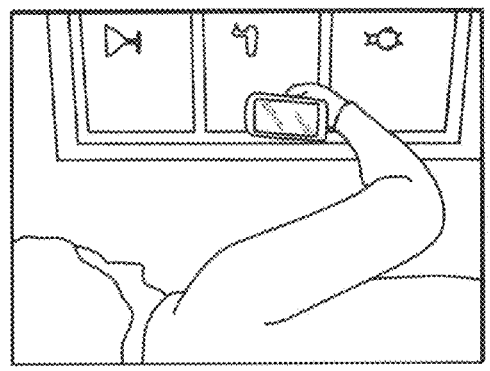
FIG. 9
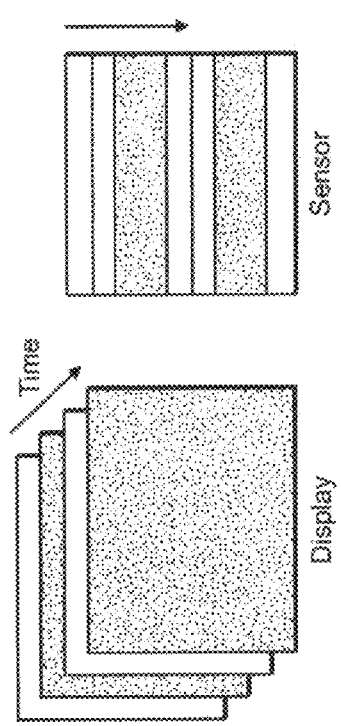
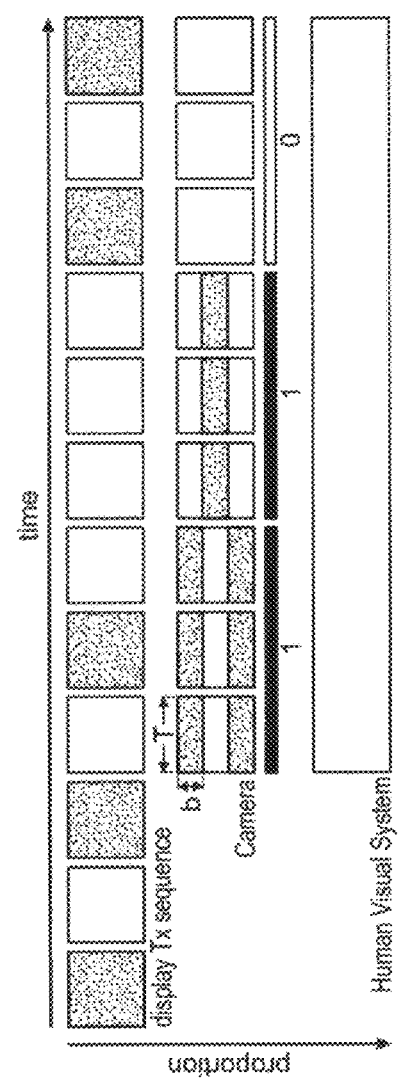
FIG. 10

VIDEO CODES FOR ENCODING/DECODING STREAMING DATA

This application claims priority to provisional application Ser. No. 61/545,779, filed on Oct. 11, 2011, the contents of which are incorporated herein by reference in their entirety.

BACKGROUND OF THE INVENTION

Increasingly, digital data is embedded in the audio and visual material that we encounter every day. An example are UPC codes that appear as familiar stripes on supermarket products and elsewhere. These are read and decoded by a special scanner, for example, at the checkout counter of the supermarket, or by handheld readers, and the data encoded therein is interpreted and used for many purposes, "QR" code's are another example, these are two-dimensional, printed or displayed codes that are designed to be interpreted by a simple camera. QR codes have become popular for many applications and are widespread. However, they are demarcated codes and most applications require that the detector be correctly aimed and centered on the code.

As more and more public and public space displays become electronic, there is a need for a code that is optimized for these displays. In addition, because these displays can change dynamically, such a code would optimally be able to be changed almost instantly and can also display an ever-changing, or a streamed set of information.

This invention relates to the encoding and decoding of streamed data and more particularly to a system and method for the display of pictures that include codes invisible to a user but detectable by a machine such as a camera along with associated computing capability. In addition, the invention describes the systems and methods for detecting and decoding those embedded codes.

The codes, called "VR codes," are signals preferably but not necessarily invisibly hidden in and around pictures in a video display such as a television screen or computer monitor that convey a stream of information to a receiver. An example receiver is a camera in a cell phone. VR codes are similar to QR codes in that they are digital tags. VR codes are an improvement over QR codes in that VR codes are a dynamic stream and can be embedded in a picture in a way that is not visible to a user. Such codes are thus an example of using displays simultaneously to carry information useful to a person and to a machine. VR codes can be made visible if so desired.

There has been related prior art work in two areas. In a first area, data is embedded in a picture to mark the picture in some way. This technique is generally called steganography. This data is intended to be digitally decodable by processing a digital signal, not from the display of the picture itself. There is also well-known work called "digital watermarking" where a pattern is embedded in a sound or picture to identify it. In other prior art work, there are visible patterns on a screen at which one can aim a simple detector in order to detect the presence of a pattern. These techniques have been used for video games. For example, a detector can be a photodiode with a lens built into a toy gun, and when one aims at a visible target, the detector notes a hit. The VR codes disclosed herein are novel in that they are optimally invisible codes that are detectable by a normal camera.

What is needed is a code that can be optimized for dynamic displays detected by simple, existing cameras such as those people have in mobile and portable devices, and that can carry information that does not intrude on the enjoyment or message of the pictures, and is detectable by the cameras we already have in mobile phones, tablets, computers and portable cameras.

It is an intention of this invention to create a code that can be embedded in a display that is invisible or minimally noticeable by people but is readily detectable and decodable by the camera and processing in a mobile device.

It is a further goal of this invention to make a code that changes with time so that a large amount of data can be transferred to the mobile device and so that codes can be readily changed.

It is yet a further goal of this invention to allow the codes to be represented in the periphery of the region of the display that is occupied with the image as well as be embedded within the image itself. The codes can be made visible so that a user can know they are there, or they cart be made invisible so that they add no readily perceptible alteration to the displayed image or image sequence.

It is yet a further goal of this invention to make the codes use an area of the screen so that the user need not aim the camera or detector, at a specific region of the screen or center it deliberately in a particular area of the frame that the camera captures.

It is a further intention of this invention to make codes that occupy a large area in and surrounding the active area of a display so that the geometric distortion of the coded display on the image plane of the camera can be used to identify the position of the viewer. I.e., the manner by which the code is detected can also be used to identify whether the user is directly in front of the display or is off axis to the left, right, high or low. The ability to use a large screen area as opposed to a small, demarcated region allows this determination to be more accurate than with localize codes such as QR codes.

SUMMARY OF THE INVENTION

In essence, one aspect of the invention operates by displaying alternating, complementary colors at the full frame rate of the display. This is rapid enough so that a normal observer sees the sum, or mixture of those colors. For example, when a blue color is alternated with a yellow one above the critical fusion frequency of the viewer, that viewer will see their sum, which in this case is white.

This same principle of rapid sequencing of colors is used, for example, in some video projectors. These projectors present a sequence of red, given, and blue images of controlled and varying intensity that allows the viewer to see a full color image. In this invention, the selection of the colors can be used to encode the data, and the use of complementary pairs presents a neutral image to the viewer.

In addition, such pairs can be created to create the perception of a great many colors and can thereby be embedded in the active region of the picture. In that case, the sum, or time-alternated mixture of the two chosen colors results in the perception of the color of the picture element or region onto which the code is being overlaid. For example, if the region of the picture is mid-level gray, then the alternation of blue and yellow that is dimmer than would sum to white would be used. Likewise, if the region is a color, then complementary deviations from that color would be used.

The data is detected in a camera because the camera operates differently from the human visual system. In essence, it most generally has a shutter of some sort Indeed, although there have been built cameras that virtually have no shutter at all, most common ones in use today have some sort of mechanism to sample the light entering the camera that has the effect of a shutter. Because that shutter, either electronically or mechanically interrupts the light to the sensor, the camera does not see an equal mixture of complementary colors as the eye does. Instead it sees a different image that will be explained in further detail below.

The system according to the invention for conveying a stream of information includes an encoding device employing a spatio-temporal coding scheme that emits light including VR codes embedded therein that are generally invisible to a user. A receiver receives light from the encoding device and computer apparatus programmed with software decodes the received light to generate the stream of information. The encoding device is a video display in a preferred embodiment, and the receiver may be a camera such as a cell phone camera. In this embodiment, the coding scheme includes error protection via redundancy coding.

In another preferred embodiment the video display displays data that is an alternating pattern of complementary colors. Alternatively, the video display displays data that is an intensity variation modulated onto picture data. The video display may display data in a blank area of the screen that may be a frame around a picture.

In a preferred embodiment, the image repetition rate of the video display, which may be either interlaced or progressively scanned is greater than the critical fusion frequency for the human eye. Suitable rates are 60 Hz and 120 Hz. For progressive displays, this is the frame rate; for interlaced displays, it is the field rate.

BRIEF DESCRIPTION OF THE DRAWINGS

FIG. 5 is an illustration showing tracking of embedded markers which are placed far apart. Each additional feature can be used to improve the tracking methods.

FIG. 6 is a schematic illustration showing the basic setup where both a human and shutter based camera viewing the screen will see different things.

FIG. 7 is a schematic illustration showing an encoder which gives a basic block diagram for how the bits are created for the display.

FIG. 8 is a block diagram of a decoder which shows how the bits are decoded with the camera.

FIG. 9 is a schematic illustration showing the Venetian blind effect where multiple frames in sequence may actually appear on a single frame.

FIG. 10, illustrates a binary scheme where a mixed color is used to represent a 1 and a solid color is used to represent a 0.

DESCRIPTION OF THE PREFERRED EMBODIMENT

Video tags for encoding/decoding streaming data are designed with spatio-temporal signatures for locating the code. The encoded data is then spread across both the spatial and temporal dimensions with the appropriate amount of redundancy coding necessary for a given application. Decoding is done by first detecting for the signature within the scene using a camera front-end which samples at a typical consumer-electronics frame rate (circa 30 frames per second). Subsequently, software decoding is done on readily available hardware. The overall system disclosed herein comprises a) the encoding hardware device which may be a consumer electronics screen or scattered mesh of emitting lights, b) a camera front-end with a normal sampling rate found on consumer electronics devices, c) a spatio-temporal coding scheme using classic redundancy coding techniques, and d) a software decoding chain which handles subsampled values.

Figure 1:
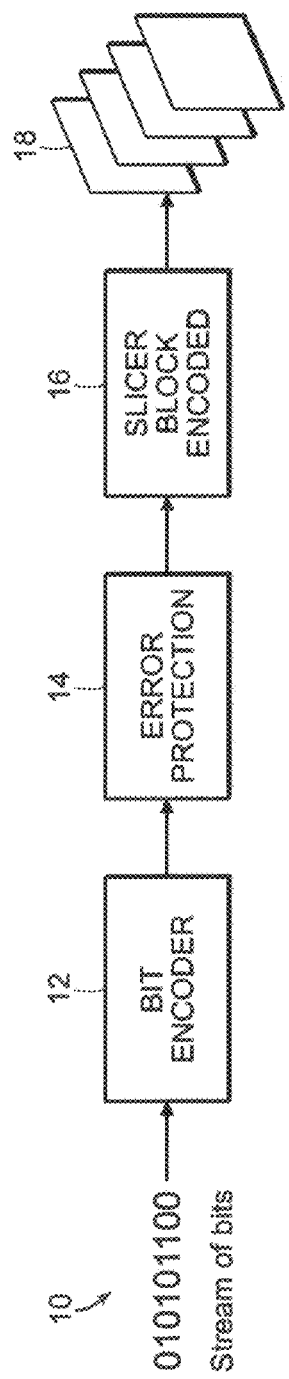
FIG. 1 is a schematic block diagram showing the encoding portion of the system disclosed herein according to one embodiment of the invention.

With reference first to FIG. 1, a stream of bits 10 is encoded in a bit encoder 12. An error correction block 14 provides error protection via redundancy coding. The slicer block-encoded 16 generates the screen code transmissions 18.

Figure 2:
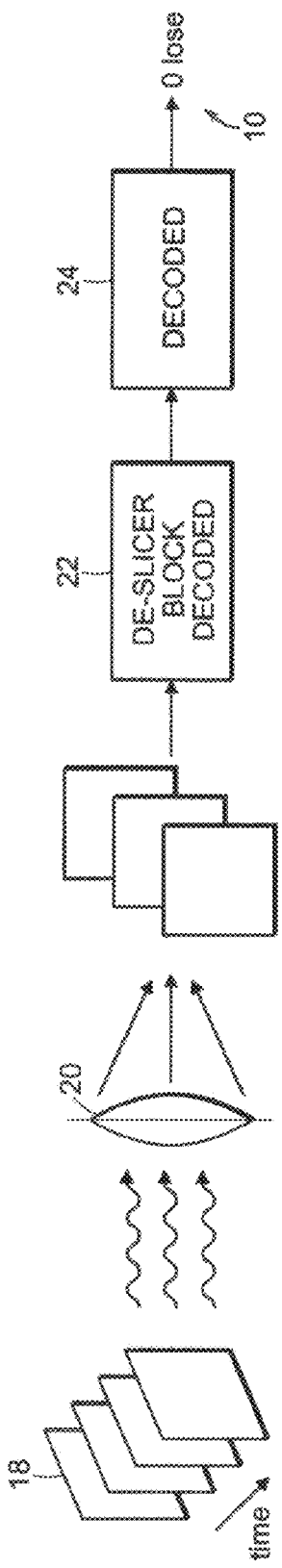
FIG. 2 is a schematic diagram showing an embodiment the decoder aspect of the present invention.

FIG. 2 shows the decoding aspect of the invention. The screen code transmissions 18 are an encoded block sequence, including information not visible to the human eye. Visible light encounters optics 20, which may be the camera on a mobile device. A sensor receives the light after being sampled further in software and proceeds to the de-slicer block decoded 22, where the signal is buffered and frame-by-frame sampled. The signal is decoded in the decoder 24 producing the stream of bits 10.

Coded patterns are designed under the constraint of the critical fusion frequency of the human eye. The data is either an alternating pattern of complementary colors or an intensity variation modulated onto the picture data, or such modulation rendered onto a blank area of the screen such as a frame around a picture. On a 60 Hz display, a variety of modulations will be invisible to a human observer, yet will be detectable by a camera. In practice, a sample modulation scheme uses the presence of a modulation to signal a binary "1" and the lack of a modulation in that area to be a "0." The screen area required for a single bitstream is dependent on the pickup situation. One can use a larger area in a situation where the camera is not precisely aligned with or aimed at the screen, or where the subject material occupies only a small area in the camera frame. One can dedicate more or less screen area to pattern space and thereby encode a variable amount of data in a display. It is also possible to make multi-scale versions that provide more data as one dwells on the screen or as one moves the camera closer to it. A 120 Hz monitor (a 3-D monitor) can provide more data than a 60 Hz monitor subject to how the human eye sees. This primarily comes from the fact that to higher frequency monitor allows for higher contrast colors to be shown using an alternating pattern. The depth of modulation is in part determined by the frame rate of the monitor and a greater modulation index allows for more data than a single bit per region. An example coding scheme is shown in the table.

TABLE

| Per pixel sender/receiver | | |
| --- | --- | --- |
| Time | Machine sees | Human sees |
| t0 | yellow (60 Hz) | gray (30 Hz) |
| t1 | blue (60 Hz) | gray (30 Hz) |
| t2 | gray | gray (30 Hz) |

For a 60 frames per second coded pattern, a higher gamma color setting is used so that different pairs of flickering patterns result in a perceived gray pattern. For a 120 frames per second coded pattern, solid RGB frequencies may be arranged in patterns to create a perceived solid gray pattern. These coded patterns have been tested on readily available consumer electronics devices, such as traditional television sets and 3-D ready television sets.

Decoding of these patterns is designed for a wide range of camera devices which may have varying shutter speeds and scan rates. The design of the decoder relies on the presence in the camera of a shutter. One result of the shutter is that the light is blocked from the sensor for some period of time, when the shutter is closed. In traditional cameras, this shutter was a mechanical device that blocked the light. In an electronic camera, it is the period of time when the charge is being sensed and transferred to the sensor readout mechanism. The time that the shutter is closed is usually a significant portion of the frame exposure time, for example, more than one percent.

This alternation of closing and opening the shutter, either electronically or mechanically implies that the camera is sampling the incident image. Such sampling causes aliasing, and this aliasing is what reveals the hidden codes. The human visual system does not introduce this aliasing.

To illustrate this point, consider an example, as illustrated in FIG. 10. The top line indicates an alternation between two complementary colors, perhaps blue and yellow. The second line indicates the time that the shutter in the camera is open, thus sampling the light. The third line indicates the actual signal on the camera sensor. As is evident from the illustration, because the shutter is closed for a part of the time that one of the colors is being displayed, the net exposure is tinted. In general, since the camera is not synchronized to the display, nor are their exposure or display rates necessarily the same, the color that is the result of the aliasing will vary, but in a detectable way.

In many cameras, the shutter does not close over the whole frame area at one time. Instead, regions of the frame are sampled and transferred to the readout circuitry of the sensor. This is similar to a shutter that is a set of "blinds", like, the Venetian Blinds used in windows. The shutter is, in effect, closed for several groups of lines in the image. This is shown in FIG. 9.

Over the course of a complete frame period, the blocking "rolls" through the picture so that by the end of the frame all lines have been read out.

This rolling shutter presents an aliased sampling pattern in one frame thus simplifying decoding, in essence, different spatial regions of the detected image are exposed at different times. This presents a color alteration on the sensor that reveals the alternation of colors directly on one frame.

The design of these decoders relies on the phenomenon that shutter cameras are not subject to the same concept of critical fusion frequency that human eyes are subject to. Instead, a camera device with a small shutter speed is subject to aliasing which results in revealing the underlying patterns generating the perceived mixed color. These decoders have been tested on camera front-ends which are embedded in widely-used computing devices such as mobile handsets and tablet computers.

Coding in the temporal dimension is designed subject to the typical critical fusion frequency of the human eye. The critical fusion frequency is non-uniform within the field of view of a typical eye. Peripheral vision is more sensitive to changing patterns. The design of video codes disclosed herein avoids obtrusiveness in the spatial dimension by creating smaller patterns of flickering patterns on which to focus. The decoder may be implemented on a wide variety of devices in which the sampling rate may be lower than the updating frequency of the video code. Although these patterns flicker in the visible light spectrum, video codes are designed so that they are unobtrusive to the human eye. The presented encoding scheme with spatio-temporal modulation of the signal allows diverse data density and patterns.

FIG. 7 is a basic encoding block diagram showing how bits are created for the display. FIG. 8 explains each step of the software decoding process. Each captured frame is processed in real-time as a part of a video-processing loop. For each loop that is processed, a chunk of bits are stored and passed up to the application.

Each frame is first preprocessed using color equalization. We point out here that in contrast to a decoding chain such as that found in the QR-code, a binary threshold step is not sufficient since there may be two color candidates for a single threshold. This is usually considered an artifact but is actually the feature relied on when using the rolling shutter. In our demonstration, we use only a binary scheme and a shortcut filter which makes a decision for each pixel i.e., hue or no hue.

Depending on the application, we use a natural marker to cut down on processing time. Specifically, in our decoding demo, we use the black edges of the screen to define a search region for the encoded sequence area. Natural markers can also be implemented as in the case for our relative positioning demo where the entire frame is scanned for the pilot sequence.

Multi-resolution scaling is implemented by estimating the necessary error correction over a particular distance. As the camera moves further away from the screen, a fewer number of pixels are exposed on the sensor board. As a result, the error rate increases with the required distance for data transmission. A predetermined number of encoding rates are available for differing uses of the screen-to-camera link. Encoding rates refer to both the physical spatial size of the code as well as the length of each symbol in the temporal code. In particular, picking the appropriate mode depends on the necessary rate requirements for the interaction application.

Robustness in detection of these codes is determined by the pilot sequences chosen. Each pilot sequence is determined based on the requirements for a specific application. The pilot sequences are used to mark the positioning of the VRCode as well as the temporal synchronization necessary for the VRCode. The decoder looks for these pilot sequences given the chosen mode for the rate.

Multi-resolution codes can also be implemented in a closed loop fashion where the error rate is sent as a parameter to the screen on which the coding is being done. If there are too many errors or a detectable but not decodable signal, the coding rate can be changed and the area dedicated to a particular code can be altered.

Once the VRCodes have been identified during decoding, the homography is calculated from the expected shape of the marker. The result is then used to apply a perspective transform to the frame. Once a valid homograph is found, it is applied to all subsequent real-time frames until another similar homography is found in the background. Only then is another perspective transform applied to incoming frames. This is done to maintain the real-time processing. In contrast to existing 2D barcodes, VRCodes are embedded in the entire imagery of the screen thus allowing it to include tracking points which are placed far apart from one another. For example, the position tracking in 2D QR codes relies on three primary markets placed in a small and confined amount of real estate. Due to the unobtrusiveness of VRCodes, the markers may be placed throughout the large image thus resulting in tracking that is significantly more accurate. FIG. 5 shows an example of this.

After applying the perspective transform, a sampling grid is created where each value can be read out from the 2D frame. Spatio-sampling requires detection of corner elements to create a grid for getting numbers. Temporal-sampling requires searching for a pilot sequence that is previously known in order to synchronize data streams. These values from the sampling grid are particularly important since they can also be used as the confidence value. Multiple samples from each cell can be used to improve confidence. Each of the analog values are then assigned a symbol for the assigned threshold value.

Finally, each sequence is decoded using a Reed Solomon decoder. The resulting decoded sequence is passed up to the application for specific use. In the case of positioning, there is no decoding step and the sampled points are directly used for calculating the relative orientation vectors. Currently, the system is realized using a screen-to-camera setup as shown in FIG. 6. The capture system relies on a rolling shutter where the supposed 15 fps is actually of significantly higher frame rate. The current method relies on the fast line scan of the camera.

As an example of the invention disclosed herein, we demonstrated a display system including an array of minified web pages, such as the front page of 25 news organizations from around the world. When one looks at this display, one can see the headlines clearly. One can then use his/her mobile device as a magnifying glass to see the details of each front page by merely positioning the phone in front of the we page of interest. The phone decodes the URL of the news organization from the embedded invisible VR codes, and uses the data from the screen to fill the phone with details. The details in turn can be a pointer to the actual website, or it can be a stream of data that appears on the phone without requiring a network access. In other words, the information that is encoded is both real content and a network pointer.

Figure 3:
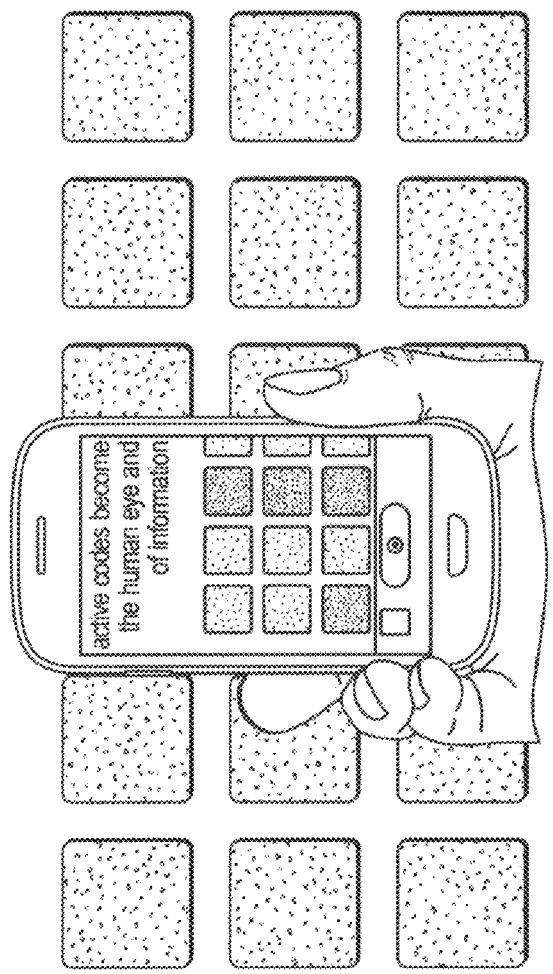
FIG. 3 is an illustration showing a demonstration of how these colors can not be perceived by the human eye but can be decoded using a camera.
Figure 4:
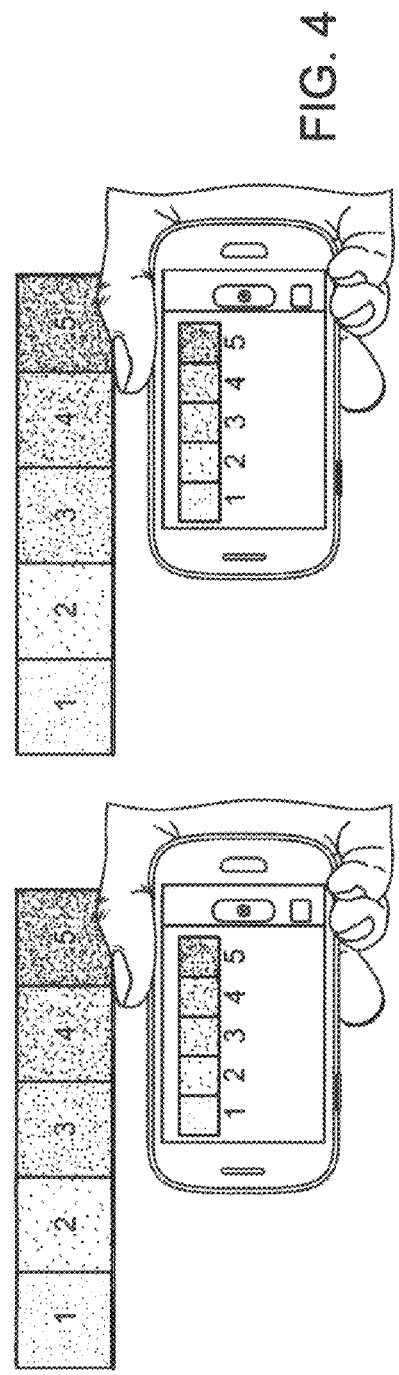
FIG. 4 is an illustration showing how multiple different combinations of these colors can be used to produce the same target gray color for the human eye but still remain resolvable by a camera.

FIG. 3 shows how active codes may appear completely unobtrusive to the eye hut carry information detectable by the camera. FIG. 4 shows that target color gray can be mixed using different color combination pairs.

Some applications of the present invention will now be described. Payments and proximal public and private key exchange fundamentally rely on a physically secure bidirectional communications channel. The public space requires a camera to interpret a machine-visible transmitting code on a human-perceivable surface. The participant carries a private key on a personal peripheral which is communicated from screen to camera in the public environment. After key verification, the system returns with a response which requires the user to authenticate using a secondary method. The components of security come from the perceivable and directional nature of the channel as well as additional authentication methods which use the same hardware for camera-based verification of natural features including the face.

Design-conscious public display installations which are an evolution from print require more embedded data to enable proximal interaction. The same codes used for print appear obtrusive and unwieldy for a designer to incorporate. VRCodes allow for beautiful designs which can embed data as well as position and orientation. Together with a cloud backend, multiple users can be served at once with differing data streams which may also be location dependent.

Directional and audio surround-sound from visual gaze allows a participant in the public space to receive audio only from a specific line of sight from multiple directions. Specifically, when used in conjunction with camera-enabled glasses, one can "hear" audio only from the direction he is looking in according to the dimensional sound that we hear in the real world. Many participants may be packed into a small space and each can hear individual digital streams of audio data. This allows automatic synchronization between audio and visual perception. Further, it can allow for true surround sound simulation from afar.

A gaming peripheral creates an image positioning system that allows relative orientation of images given a specific marker. In a similar domain as photosynth, multiple people can take images from different angles. Each picture can be stretched and morphed according to the precise position coordinates obtained from an active marker. The resulting captured images can be displayed across a screen. This same concept can be used on a microscale where an optical-based pen can be used on a surface which embeds digital position data.

It is recognized that modifications and variations of the present invention will be apparent to those of ordinary skill in the art and it is intended that all such modifications and variations be included within the scope of the appended claims.

What is claimed is:

1. System for conveying a stream of information comprising:
    an encoding device employing a spatio-temporal coding scheme that emits light including VR codes embedded therein that are invisible to a user;
    a receiver that receives the light from the encoding device, the receiver being a rolling shutter camera unsynchronized with the encoding device to sample the light; and
    computer apparatus programmed with software to decode the received sampled light to generate the stream of information.

2. The system of claim 1 wherein the encoding device is a video display.

3. The system of claim 1 wherein the coding scheme includes error protection via redundancy coding.

4. The system of claim 2 where the video display displays data that is an alternating pattern of complementary colors.

5. The system of claim 2 where the video display displays data that is an intensity variation modulated onto picture data.

6. The system of claim 2 where the video display displays data in a blank area of the screen.

7. The system of claim 2 wherein the frame rate of the video display is greater than critical fusion frequency of the human eye.

8. The system of claim 7 wherein the frame rate is 60 Hz.

9. The system of claim 7 wherein the frame rate is 120 Hz.

10. The system of claim 6 wherein the blank area is a frame around a picture.

* * * * *